United States Patent
Wang et al.

(10) Patent No.: US 12,500,817 B2
(45) Date of Patent: Dec. 16, 2025

(54) SYSTEM AND A METHOD FOR OPTIMIZING A CABLE SYSTEM IN A TELECOMMUNICATION NETWORK

(71) Applicant: Centre for Intelligent Multidimensional Data Analysis Limited, Pak Shek Kok (HK)

(72) Inventors: Tianjiao Wang, Pak Shek Kok (HK); Moshe Zukerman, Pak Shek Kok (HK); Bill Moran, Pak Shek Kok (HK)

(73) Assignee: Centre for Intelligent Multidimensional Data Analysis Limited

( * ) Notice: Subject to any disclaimer, the term of this patent is extended or adjusted under 35 U.S.C. 154(b) by 7 days.

(21) Appl. No.: 18/454,249

(22) Filed: Aug. 23, 2023

(65) Prior Publication Data

US 2025/0071024 A1  Feb. 27, 2025

(51) Int. Cl.
*H04L 41/12* (2022.01)
*H04L 41/5003* (2022.01)
*H04L 41/0823* (2022.01)
*H04L 41/0896* (2022.01)

(52) U.S. Cl.
CPC .......... *H04L 41/12* (2013.01); *H04L 41/5003* (2013.01)

(58) Field of Classification Search
CPC . H04L 41/12; H04L 41/5003; H04L 41/0823; H04L 41/0896
See application file for complete search history.

(56) References Cited

U.S. PATENT DOCUMENTS

| | | | |
|---|---|---|---|
| 6,374,202 B1* | 4/2002 | Robinson | H04Q 3/0079 703/20 |
| 11,228,523 B2 | 1/2022 | Zukerman et al. | |
| 11,500,125 B2 | 11/2022 | Zukerman et al. | |

(Continued)

OTHER PUBLICATIONS

Author: Wang et al. Title: Submarine Cable Network Design for Regional Connectivity Publisher: arxiv.org URL: https://arxiv.org/abs/2201.05802 (Year: 2022).*

(Continued)

*Primary Examiner* — Kamal M Hossain
(74) *Attorney, Agent, or Firm* — Renner, Kenner, Greive, Bobak, Taylor & Weber

(57) ABSTRACT

A system and a method for optimizing a cable system in a telecommunication network Includes the steps of: receiving a position of each of a plurality of terminal nodes and a minimum bandwidth requirement associated with an operation of the telecommunication network including the plurality of terminal nodes and a plurality of branching nodes, wherein the telecommunication network is arranged to facilitate communication among the plurality of terminal nodes via at least one of the plurality of branching nodes; determining, between adjacent pairs of nodes of terminal nodes or branching nodes, a distance and a bandwidth capacity of a cable edge between each adjacent pair; and providing an optimized geographical location of the branching nodes and an optimized bandwidth capacity of each cable edge in which the telecommunication network being deployed with the branching nodes and the cable edges meets a quality of service associated with the minimum bandwidth requirement.

16 Claims, 7 Drawing Sheets

(56) References Cited

U.S. PATENT DOCUMENTS

| | | | | |
|---|---|---|---|---|
| 2013/0289966 | A1* | 10/2013 | Forbes | H04L 41/145 |
| | | | | 703/13 |
| 2015/0248461 | A1* | 9/2015 | Theeten | G06F 16/24524 |
| | | | | 707/718 |
| 2020/0028746 | A1* | 1/2020 | Zawadzki | H04L 41/5009 |
| 2020/0252327 | A1* | 8/2020 | Zukerman | H04L 45/126 |
| 2023/0118359 | A1* | 4/2023 | Wang | H04L 41/145 |
| | | | | 370/254 |
| 2023/0396506 | A1* | 12/2023 | Wang | H04L 41/145 |

OTHER PUBLICATIONS

T. Wang, Z. Wang, B. Moran, et. al., "Latency-Aware Optimization of Submarine Communication Cable Systems with Trunk-and-Branch Topologies", Journal of Lightwave Technology, vol. 40, No. 17, pp. 5825-5841, Sep. 2022.

T. Wang, Z. Wang, B. Moran, et. al., "Submarine Cable Network Design for Regional Connectivity", IEEE/ACM Transactions on Networking, vol. 30, No. 6, pp. 2480-2492, Dec. 2022.

X. Wang, Z. Wang, E. Tahchi, et. al., "Submarine Cable Path Planning Based on Weight Selection of Design Considerations", IEEE Access, vol. 9, pp. 123847-123860, Sep. 2021.

T. Wang, X. Wang, Z. Wang, et. al., "Optimal Tree Topology for a Submarine Cable Network With Constrained Internodal Latency," Journal of Lightwave Technology, vol. 39, No. 9, pp. 2673-2683, May 2021.

Q. Wang, J. Guo, Z. Wang, et. al., "Cost-Effective Path Planning for Submarine Cable Network Extension," IEEE Access, vol. 7, No. 1, pp. 61883-61895, May 2019.

* cited by examiner

SYSTEM AND A METHOD FOR OPTIMIZING A CABLE SYSTEM IN A TELECOMMUNICATION NETWORK

TECHNICAL FIELD

The invention relates to a system and a method for optimizing a cable system in a telecommunication network, and particularly, although not exclusively, to a system and a method for optimizing submarine cable arrangement in a telecommunication network.

BACKGROUND

While satellite links can provide intercontinental communication, fiber optic submarine cables on the seabed is more preferable in some applications. Submarine optical internet cables play a crucial and important role in global communication, transmitting over 99% of global internet data. Specialized ships deploy optical submarine cables in the sea, connecting terminal stations located on the shores. Cables accommodate multiple fibers, each with a high bandwidth capacity, allowing faster and more efficient data transfer than satellites. In part, this is because submarine cables are more cost-effective for long-term, high-volume communication, though the costs of these cables usually increase with the number of optical fibers. Submarine cable costs may also be influenced by seabed topography, ocean environment, and communication demands.

Typically, newer cables carry more data than cables laid 15 years ago: increasing from hundreds of megabits per second to hundreds of terabits per second (Tb/s) capacity. For example, MAREA cable can carry 224 Tb/s. In a trans-Atlantic system, a capacity of 250 Tb/s across 12 fiber pairs, and spanning 4.1k miles (6.6k kilometers), connecting Virginia Beach (United States) with Saint-Hilaire (France) is in operation.

SUMMARY OF THE INVENTION

In accordance with a first aspect of the present invention, there is provided a system for optimizing a cable system in a telecommunication network, comprising: a processing module arranged to determine a distance based on a position of each of a plurality of terminal nodes and a bandwidth capacity of a cable edge between each of adjacent pairs of nodes of the plurality of terminal nodes or a plurality of branching nodes provided in a telecommunication network, wherein the telecommunication network is arranged to facilitate communication among the plurality of terminal nodes via at least one of the plurality of branching nodes; and an optimization module arranged to provide an optimized geographical location of the branching nodes and an optimized bandwidth capacity of each cable edge in which the telecommunication network being deployed with the branching nodes and the cable edges meets a quality of service (QOS) requirement associated with a minimum bandwidth requirement associated with an operation of the telecommunication network.

In accordance with the first aspect, the telecommunication network includes a submarine cable network comprising a plurality of submarine cables with different cable specifications.

In accordance with the first aspect, the optimized geographical location of the branching nodes are positions of Steiner nodes determined by the optimization module using a weighted edges Steiner minimum tree process.

In accordance with the first aspect, the optimization module is arranged to determine the optimized geographical locations of the plurality of branching nodes and cable paths connecting the branching nodes in a subnetwork connecting the plurality of terminal nodes In accordance with the first aspect, the processing module is arranged to compose a subtree of Steiner nodes connected by connecting edges, wherein the subtree is arranged to connect with the plurality of terminal nodes in a skeleton tree.

In accordance with the first aspect, the processing module is further arranged to solve a dynamic programming problem associated with an optimization problem for a total cost of the physical cable network formed by the cable edges in the telecommunication network to determine a minimum cumulative cost of the cable edge and the branching nodes.

In accordance with the first aspect, the optimization module is further arranged to determine the optimized geographical locations of the plurality of branching nodes and cable paths based on additional attributes associated with a deployment of the telecommunication network and/or the maintenance of the telecommunication network after deployment.

In accordance with the first aspect, the additional attributes includes at least one of laying cost of the submarine cables, repair rates of the branching nodes or the submarine cables and cable paths based on geodesics.

In accordance with the first aspect, the optimization module is further arranged to shorten the cable edge with highest capacity than other cable edges within the telecommunication network thereby optimizing an efficiency of utilization of cable resources during the deployment of the telecommunication network.

In accordance with the first aspect, the repair rates of the branching nodes or the submarine cables are associated with earthquake-related cable damage risk and human activity-related risk at a predetermined geographical location.

In accordance with a second aspect of the present invention, there is provided a method for optimizing a cable system in a telecommunication network, comprising the steps of: receiving a position of each of a plurality of terminal nodes and a minimum bandwidth requirement associated with an operation of the telecommunication network including the plurality of terminal nodes and a plurality of branching nodes, wherein the telecommunication network is arranged to facilitate communication among the plurality of terminal nodes via at least one of the plurality of branching nodes; determining, between adjacent pairs of nodes of terminal nodes or branching nodes, a distance and a bandwidth capacity of a cable edge between each adjacent pair; and providing an optimized geographical location of the branching nodes and an optimized bandwidth capacity of each cable edge in which the telecommunication network being deployed with the branching nodes and the cable edges meets a quality of service (QOS) requirement associated with the minimum bandwidth requirement.

In accordance with the second aspect, the telecommunication network includes a submarine cable network comprising a plurality of submarine cables with different cable specifications.

In accordance with the second aspect, the optimized geographical location of the branching nodes are positions of Steiner nodes determined by using a weighted edges Steiner minimum tree process.

In accordance with the second aspect, the weighted edges Steiner minimum tree process comprises the step of the determining the optimized geographical locations of the plurality of branching nodes and cable paths connecting the branching nodes in a subnetwork connecting the plurality of terminal nodes In accordance with the second aspect, the step of determining the optimized geographical locations of the plurality of branching nodes comprising the step of composing a subtree of Steiner nodes connected by connecting edges, wherein the subtree is arranged to connect with the plurality of terminal nodes in a skeleton tree.

In accordance with the second aspect, the method further comprises the step of solving a dynamic programming problem associated with an optimization problem for a total cost of the physical cable network formed by the cable edges in the telecommunication network to determine a minimum cumulative cost of the cable edge and the branching nodes.

In accordance with the second aspect, the method further comprises the step of determining the optimized geographical locations of the plurality of branching nodes and cable paths based on additional attributes associated with a deployment of the telecommunication network and/or the maintenance of the telecommunication network after deployment.

In accordance with the second aspect, the additional attributes includes at least one of laying cost of the submarine cables, repair rates of the branching nodes or the submarine cables and cable paths based on geodesics.

In accordance with the second aspect, the method further comprises the step of shortening the cable edge with highest capacity than other cable edges within the telecommunication network thereby optimizing an efficiency of utilization of cable resources during the deployment of the telecommunication network.

In accordance with the second aspect, the repair rates of the branching nodes or the submarine cables are associated with earthquake-related cable damage risk and human activity-related risk at a predetermined geographical location.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The inventors devised that submarine cables may be built with 4 to 8 fiber pairs, or in some more advanced network, internet cables may be built with 12, 16, 24, and 36 fiber pairs. To optimize a cable network, it is essential to minimize the cost of all components while maintaining the QoS requirements. This involves optimizing the location of (branching units) BUs and (cable landing stations) CLSs, calculating the cable path based on geodesics, and taking into account the bandwidth requirements of the cable.

In one preferred embodiment, the submarine cable network optimization problem may be modeled as a weighted edges Steiner minimal tree problem, taking into account the bandwidth capacity of each cable edge on the network. This is an important consideration for optimizing submarine cable networks. Preferably, the weighted edges Steiner minimum tree (WE-SMT) algorithm may be employed to effectively optimize the position of Steiner nodes, the bandwidth capacity of each cable edge, and the cable path for given terminal node locations and bandwidth capacity requirements. Advantageously, the WE-SMT algorithm may be applied to real-world scenarios, making it a practical solution for optimizing submarine cable networks.

Figure 1:
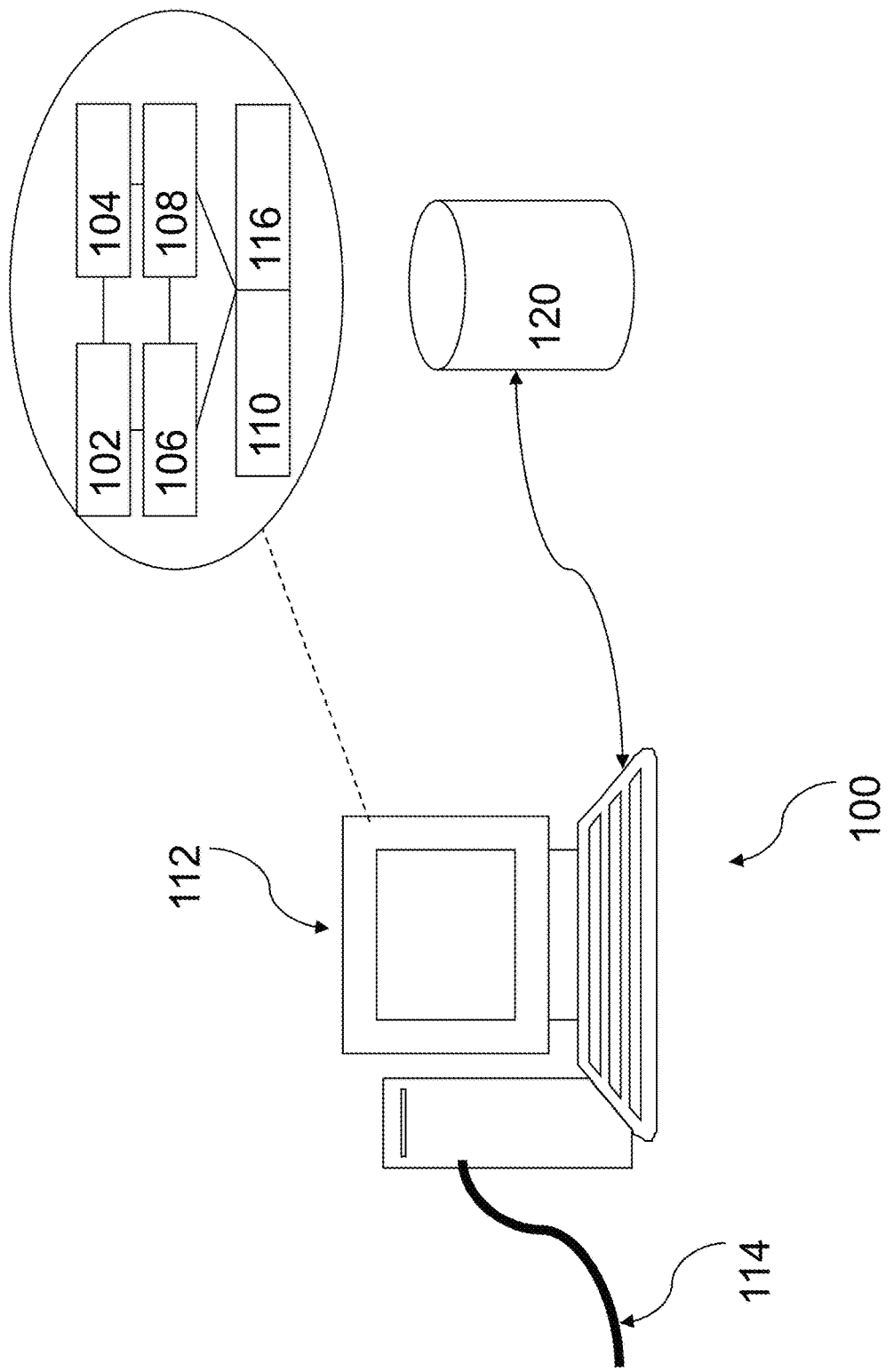
FIG. 1 is a schematic diagram of a computer server which is arranged to be implemented as a system for optimizing a cable system in a telecommunication network in accordance with an embodiment of the present invention.

As shown in FIG. 1 there is a shown a schematic diagram of a computer system or computer server 100 which is arranged to be implemented as an example embodiment of a system for optimizing a cable system in a telecommunication network. In this embodiment the system comprises a server 100 which includes suitable components necessary to receive, store and execute appropriate computer instructions. The components may include a processing unit 102, including Central Processing Unit (CPUs), Math Co-Processing Unit (Math Processor), Graphic Processing Unit (GPUs) or Tensor Processing Unit (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
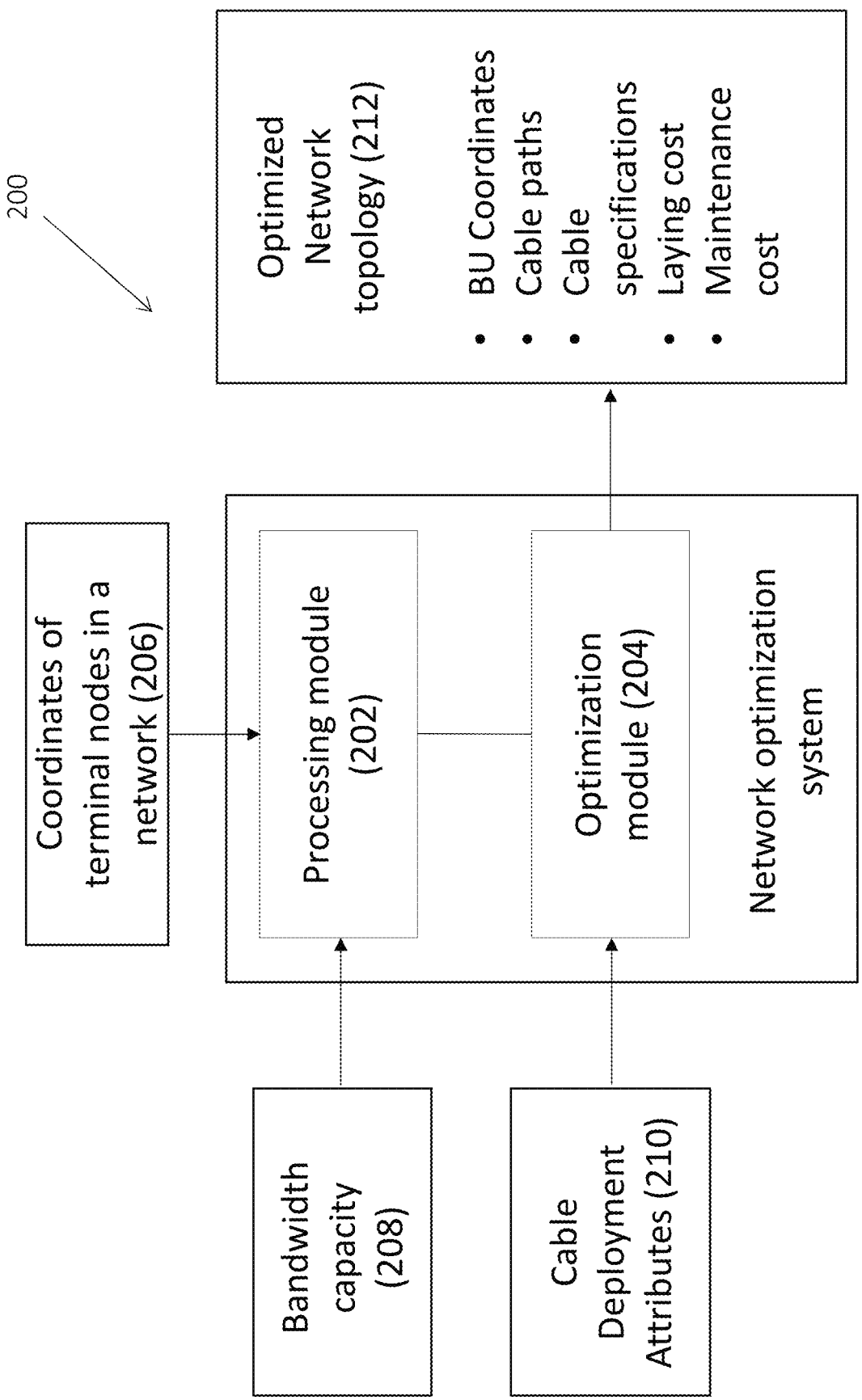
FIG. 2 is a block diagram showing a system for optimizing a cable system in a telecommunication network in accordance with an embodiment of the present invention.

With reference to FIG. 2, there is shown an embodiment of the system 200 for optimizing a cable system in a telecommunication network. In this embodiment, the server 100 is used as part of a system 200 as arranged to receive positions of a plurality of terminate nodes, such as coordinates of ports in different towns/cities, in a telecommunication network, the server 200 may then analyze an optimized cable arrangement of the network, so that the telecommunication network can facilitate telecommunication among all the terminate nodes, via at least one branching nodes to be deployed, and finally provide an optimized position of each of the branching nodes, considering bandwidth of each of cable connecting adjacent branching nodes or terminal nodes, and a QoS requirement.

In this embodiment, the system 200 comprises a processing module 202 arranged to receive input coordinates 206 of terminal nodes, such as coordinates of a network facility at multiple spots or countries across the ocean, the processing module may determine a distance between different terminal nodes, to determine a possible implementation of a branching nodes that may be deployed to facilitate the network deployment, considering also the bandwidth capacity 208 or QoS requirement or expectation.

For example, a telecommunication network implemented by a plurality of submarine network cables is to be deployed to facilitate communication among three geographical locations A, B and C, i.e. the terminal nodes 206, the processing module may determine the distance of between each adjacent pairs of nodes A and B, B and C, and A and C. Instead of deploying three submarine cable nodes A to B, A to C and B to C, it may be more preferable to deploy a branching node that may be proximate to a mid-point of nodes A, B and C, and the submarine cables respectively connect from nodes A, B and C to the branching nodes, given the bandwidth requirement of the network between each of the adjacent pairs of nodes as input.

Depending on the specification, e.g. maximum bandwidth support by the cable, the bandwidth between each pair of terminal nodes may be different, and it is preferable to more precisely determine the bandwidth of the cables to be deployed, as well as the position of the branching nodes. In one preferred embodiment, the system may be used for optimizing the telecommunication network for facilitating communication among the plurality of terminal nodes via at least one of the plurality of branching nodes, based on also one or more cable deployment attributes 210 which are provided to the optimization module 204 of the system 200.

For example, it may be preferred to move the branching node to a position closer to the terminal node A when compared to nodes B and C if the QoS requirement or the bandwidth capacity of the cable link connecting node A is higher than those links connecting to B or C, e.g. if A is a city with higher population or a major data center is implemented close to node A. In this example, the optimization module 204 may consider different cable deployment attributes 210 such as laying cost and maintenance cost of the cable, risks associated with operations of the network including cable edges of different cable specifications, and determine an optimized network topology 212 including these optimized parameters for actual implementation.

Preferably, referring to FIG. 2, the system 200 for optimizing a cable system in a telecommunication network comprising a processing module 202, for determining a distance based on positions of the terminal nodes and the bandwidth capacity of a cable edge between each pair of nodes in the entire network, either between a pair of terminal nodes, a pair of branching nodes, or between a terminal nodes and a branching node, and an optimization module 204 to optimize the distance of each pair of nodes according to multiple parameters, such as bandwidth capacity of each cable edge, the QoS requirement of the network, hence a minimum bandwidth capacity of each pair of nodes, difficulties in deploying each cable, cost of each cable.

The processing module 202 and the optimization module 204 may also consider other attributes or parameters that may also affect the operation and/or operational cost involved in the network. For example, it is usually desirable to avoid laying a cable along a node or spot which is vulnerable to damages, or positions which may be difficult to access to perform maintenance. and thus avoiding high maintenance cost that may be incurred to operate the network.

For example, if it is unavoidable that the cable must be laid along a path that includes one or more "dangerous spots", additional protections to the cable may be provided, which may increase the laying cost a bit, but not as expensive than routing a longer cable between two nodes, as an alternative approach to avoid high maintenance cost that may be incurred. The optimization module 204 consider these additional cable deployment attributes when optimizing the path or distance between each adjacent pair to obtain the optimized network topology 212.

As described earlier, submarine cables may be provided in forms of different number of fiber pairs, to provide different bandwidth capacities. It may not be desirable to deploy cables with the same specifications to connect nodes that requires different QoS. For example, it would not be an effective approach to connect a terminal node and a branching node that require only a low bandwidth capacity of 50 Tbps using a cable that can support a maximum bandwidth of 100 Tbps, considering the laying cost and the maintenance cost of a 100 Tbps fiber cable is substantially higher than that of a 50 Tbps cable. On the other hand, it is also undesirable to use a 50 Tbps cable to connect with two nodes that requires a QoS requirement of 100 Tbps, since the QoS requirement must be met.

Without wishing to be bound by theory, submarine cable path optimization may be delineated in several sub-areas, for example, for point-to-point cable path planning, a raster-based approach to path planning may be used to determine the cable path with minimal cost by minimizing the weighted sum of seismic risk and cable length. In this example, the technique utilizes Dijkstra's algorithm, however, one drawback of this method is that the path must traverse either a diagonal or lateral edge between adjacent cells, furthermore, such method may only be applicable in point-to-point cable path planning.

In an alternative example, a method based on the fast marching method (FMM) for cable path planning on the earth's surface may be employed. FMM is a path planning approach that avoids the weaknesses of Dijkstra's algorithm by solving the Eikonal equation as the grid size of the triangulated manifold approaches zero. Alternatively, account of multiple design levels of cable shielding may be taken and FMM may be applied to design optimal cable paths. The cable path planning problem may be addressed as a multi-objective optimization problem, taking account of cable breaking risk, cable laying cost, and multiple design levels for cable shielding, however, bandwidth optimization was not taken into consideration.

For cable network design problems, another method based on FMM and Integer Linear Programming to optimize a tree-topology network design for a submarine cable system that connects multiple stations may be used. Additionally, a lightweight heuristic algorithm to solve the problem at hand may also be employed. The optimization problem may be formulated as a minimum spanning tree (MST) problem, where the goal was to construct a tree-topology cable network without additional Steiner nodes at minimum cost.

In yet an alternative example, an FMM-based method may be used to achieve a trunk-and-branch tree network topology for submarine cable systems that connect multiple landing stations. In this example, the optimization of the trunk-and-branch tree network problem may be performed as a Steiner minimum tree (SMT) problem and, based on dynamic programming, the minimum tree on an irregular 2-dimensional manifold in a 3-dimensional Euclidean space for a given topology in polynomial time may be obtained. Although these methods consider cable construction costs, the expenses associated with bandwidth requirements and Branching Unit (BU) installation are not considered.

The inventors devised that, to optimize a cable network, minimizing the cost of all components while maintaining the quality of service (QOS) requirements is essential. Preferably, this involves optimizing the location of BUs and CLSs, calculating the cable path based on geodesics, and taking into account the bandwidth requirements of the cable.

Preferably, the optimization module 204 is arranged to provide an optimized geographical location of the branching nodes and an optimized bandwidth capacity of each cable edge, and the optimized geographical location of the branching nodes, e.g. in the optimized network topology 212 are positions of Steiner nodes determined by the optimization module 204 using a weighted edges Steiner minimum tree process. The objective is to construct a trunk-and-branch tree topology cable network, including Steiner nodes, and satisfy capacity demand requirements between specified nodes, at minimal cost, where cost will be discussed below.

In this example, the edges of the SMT are computed to be minimal cost geodesics in M, rather than straight lines or great circles. The ambient space in this example is a triangulated manifold, M, representing the Earth's surface. In M, paths of cables between pairs of terminals, or Steiner nodes, are geodesics relative to the cost function and may be calculated using the Fast Marching Method (FMM). Optimal connections between nodes are shaped according to localised costs of the specific path.

Preferably, to be a little more precise, M may be defined to be the set of mesh points in the compact triangulated M; N is the number of terminal nodes, H is the set of capacity requirement between pairs of terminal nodes; Nb is the number of Steiner nodes; $S=\{s_1, s_2, \ldots, s_{Nb}\}$ is the set of their locations; $\Gamma$ is the set of geodesics of the Steiner tree; $c_b$ is the cost of a BU (all BUs have the same cost in the model); $l_i$ is a link in the Steiner tree, $b_i$ is the bandwidth of the corresponding link $l_i$. f(s) denotes the cost of the cable system; this depends on the locations of the BUs and the cost of BUs and cable links. The cost of cable links depends on the capacity of the cable and the cable length.

$$f(s) = \sum_{\gamma_j \in \Gamma} C(\gamma_i) + c_{BU} \cdot N_{BU}. \tag{1}$$

The cost $C(\gamma)$ of a cable along geodesic $\gamma$ depends on several factors but, to a good approximation grows, as the geodesic length of the cable:

$$C(\gamma) = \int_0^{l(\gamma)} c(\gamma(s), b) ds \tag{2}$$

where the local cost $c(\gamma(s), b)$ at location S is a function of the laying cost in location $\gamma(s)$, risks associated with the locality, and the bandwidth b required for that edge of the cable. The relationship between bandwidth and cable cost per kilometer is assumed to be $c(x)=B \cdot x+A$, where B is the bandwidth capacity of the cable, measured in the number of fibers. The fixed cost of cable construction, denoted by A, is determined by industry experts, or may be determined based on other references or datasheets.

Figures 3A, 3B:
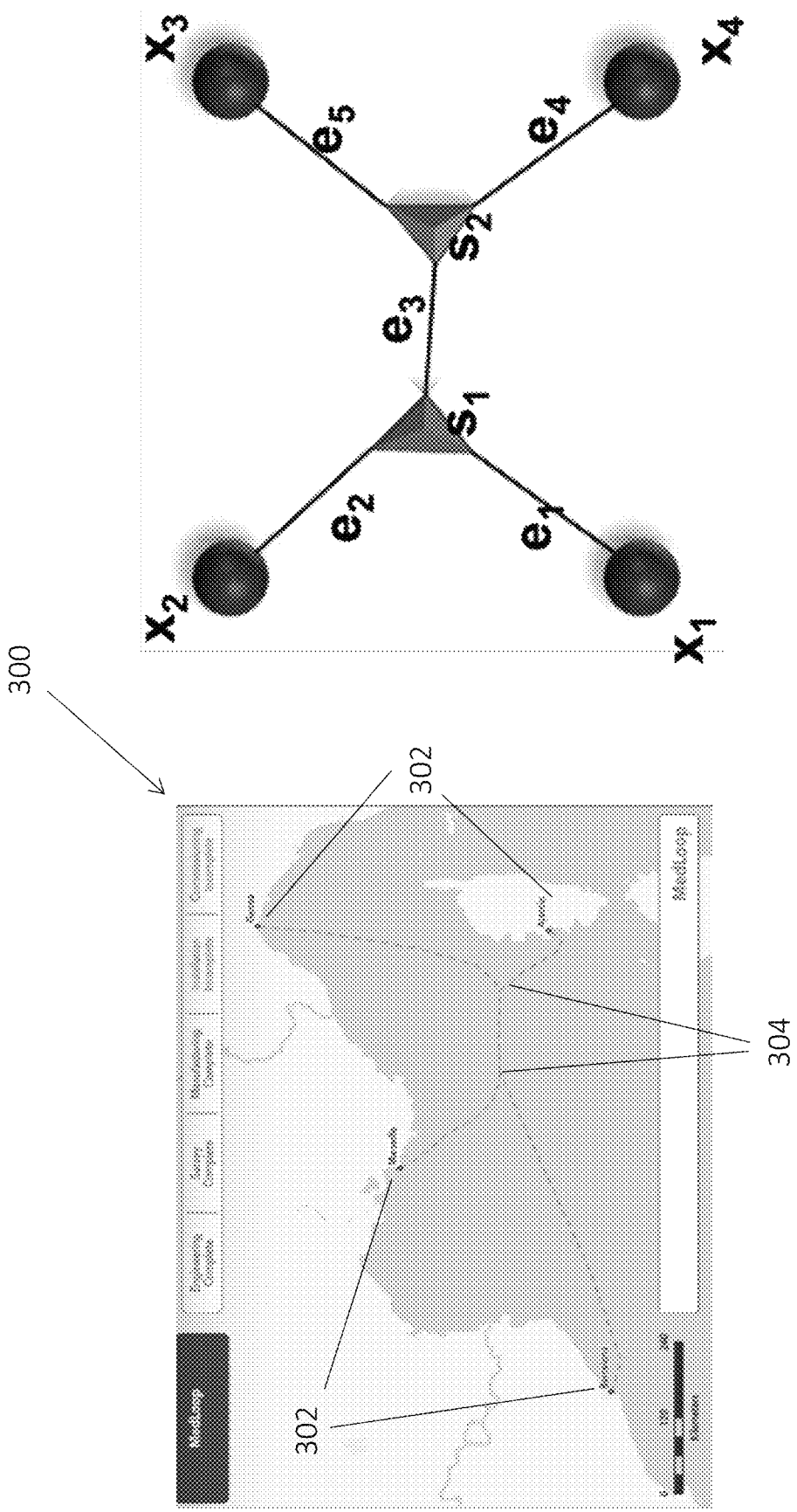
FIG. 3A is a map of an example telecommunication network connecting four terminals.
FIG. 3B is an illustration showing an example network topology of FIG. 3A.

Preferably, the optimization module 204 is arranged to determine the optimized geographical locations of the plurality of branching nodes and cable paths connecting the branching nodes in a subnetwork connecting the plurality of terminal nodes. For example, with reference to FIG. 3A, there is shown an example cable system 300 that includes four terminals 302 and two BUs 304, and its corresponding topology is shown in FIG. 3B, which consists of four terminals, namely $x_1$, $x_2$, $x_3$, and $x_4$, connected to two Steiner nodes (representing BUs) denoted by $s_1$ and $s_2$, along with five cable links represented by edges $e_1$, $e_2$, $e_3$, $e_4$, and $e_5$.

Preferably, in a tree topology network, only one path connects each pair of nodes; p $(x_i, x_j)$ represents the path between nodes $x_i$ and $x_j$. Each path has a data bandwidth requirement denoted by $h(x_i, x_j)$. This means that edge $e_1$ has to accommodate the bandwidth requirements of paths $p(x_1, x_2)$, $p(x_1, x_3)$, and $p(x_1, x_4)$, so that, $B(e_1) \geq h(x_1, x_2) + h(x_1, x_3) + h(x_1, x_4)$. Similarly, edges $e_2$ and need handle $e_3$ to the bandwidth requirements of paths $p(x_1, x_2)$, $p(x_2, x_3)$, $p(x_2, x_4)$, and of paths $p(x_1, x_3)$, $p(x_1, x_4)$, $p(x_1, x_3)$, and $p(x_2, x_4)$, respectively.

Preferably, cable edge costs may be determined by the number of fibers in, and the hence capacity of the cable. In one preferred example, to minimize total costs, higher bandwidth edges may be shortened. Minimization of the total cost of the cable system requires optimal placement of the two BUs, $s_1$ and $s_2$, and this involves factoring in the costs of the five cable edges, each with different bandwidth requirements and costs, as well as the cost of the BUs.

For this four terminal nodes example, taking into account the cable system optimization problem, the cable bandwidth capacity can be written as:

$$\min_{SMT} S \in H, \Gamma \ f(s)$$
$$\text{s.t. } B(e_1) \geq h(x_1, x_2) + h(x_1, x_3) + h(x_1, x_4),$$
$$B(e_2) \geq h(x_1, x_2) + h(x_2, x_3) + h(x_2, x_4),$$

-continued $$B(e_3) \geq h(x_1, x_3) + h(x_1, x_4) + h(x_2, x_3) + h(x_2, x_4),$$

$$B(e_4) \geq h(x_1, x_4) + h(x_1, x_4) + h(x_3, x_4),$$

$$B(e_5) \geq h(x_1, x_3) + h(x_2, x_3) + h(x_3, x_4).$$

For the general problem, the locations of terminal nodes are given, as are bandwidth capacity requirements between these nodes, may be provided to the processing module 202. It is necessary to optimize the position of Steiner nodes, the bandwidth capacity of each cable edge, and the cable path.

The cable network optimization problem is an SMT problem with weighted edges and a tree topology $\mathcal{T}$. BUs are at Steiner nodes and the CLSs at the terminal nodes. Connections between nodes (Steiner and terminal) are edges in the tree. A topology $\mathcal{T}$ is called a Steiner topology if the degree of each Steiner node (terminal node) is equal to 3 (≤3, respectively).

For N terminals $x_1, x_2, \ldots, x_N \in \mathbb{M}$ with a given topology $\mathcal{T}$, let $N=\{1, 2, \ldots, N\}$ be the index set of terminals, $S=\{N+1, N+2, \ldots, N+M\}$ the index set of Steiner nodes (M≤N−2), and V=N∪S. Let $E=E_1 \cup E_2$ be the set of all edges, i.e., $\mathcal{T} =(V, E)$, where $E_1=\{(i, j)|i \in N, j \in S\}$ and $E_2=\{(i, j)|i \in S, j \in S\}$. It is preferable to find the coordinates of Steiner nodes: $x_{N+1}, x_{N+2}, \ldots, x_{N+M} \in \mathbb{M}$, the paths $\Gamma=\{\gamma(e)|e \in E\}$ (i.e., the geodesics corresponding to the edges in E) as well as the specific cable bandwidth level required for the edges, so that the cable network has minimal cost subject to satisfying the bandwidth requirement for each pair of terminal nodes.

Preferably, tall terminals and all potential Steiner nodes may be constraint to be grid nodes $x_i$ of $\mathbb{M}$, $x_i \in \mathbb{M}$ (only given the coordinates of grid nodes of $\mathbb{M}$ in practice). To accommodate and balance laying costs against risk to the cable, at each grid point x in D, let $$f'(x, \alpha(x)) = \min_u (h(x, u) + \alpha \cdot g(x, u)),$$

where h(x, u) and g(x, u) are the laying cost and the repair rate at grid point x, respectively, with cable band-width level u. Application of FMM to this cost, produces the optimal path between any pair of grid nodes in $\mathbb{M}$.

Firstly, based on the bandwidth requirement for each path between the specified pair of nodes, the minimum bandwidth requirement for each cable edge, $B(e_1), \ldots, B(e_5)$, may be calculated. The per kilometer cable cost of an edge may be determined based on the expertise of a cable specialist, and is, say, $\beta(e_1), \ldots, \beta(e_5)$. Note that, cable bandwidth is fixed within each link. For example, cables used in the industry may contain 4, 8, or 16 fibers, are ascribed capacities $B_4$, $B_8$ and $B_{16}$, with corresponding costs by $C_4$, $C_8$ and $C_{16}$, respectively. The size of this set of available bandwidths can be varied according to available industry capability. The aim of the problem is to find the optimal positions of BUs, the optimal cable paths connecting two Steiner nodes and Steiner-terminal nodes, and assigns appropriate cable bandwidth levels, $B_4$, $B_8$ or $B_{16}$, to each cable edge.

The optimization problem for the total cost $\Psi(\mathcal{T})$, of the physical cable network $\mathcal{T}$, is formulated in Eq. (3).

$$\min_{X, \beta(\cdot), \Gamma} \Psi(x, \beta(x), \Gamma) = \min_{X, \beta(\cdot)} \left( \sum_{j \in S} \overline{c}_\beta(x_j) + \sum_{(i,j) \in E_2} \min \frac{c_\beta(x_i, x_j)}{\gamma_{ij}} \right) + M \cdot c_{BU} \quad (3)$$

where $x=\{x_{N+1}, x_{N+2}, \ldots, x_{N+M}\}$, $x_{N+j} \in \mathbb{M}$ are coordinates of the Steiner nodes.

$$\overline{c}_\beta(x_j) = \sum_{i \in N, (i,j) \in E_1} \min \frac{c_\beta(x_i, x_j)}{\gamma_{ij}}$$

is the sum of the minimum weighted cost from each terminal that is a neighbor of $x_j$ to $x_j$ itself, which can be calculated using FMM with the terminal being the source node, while considering the cable bandwidth $B(\bullet) \in \{C_4, C_8, C_{16}\}$. Let $\overline{c}_\beta(x_j)=0$, if no terminal is adjacent to the Steiner node $x_j$, M and $c_{BU}$ are the number and cost of BUs, respectively.

Figure 4:
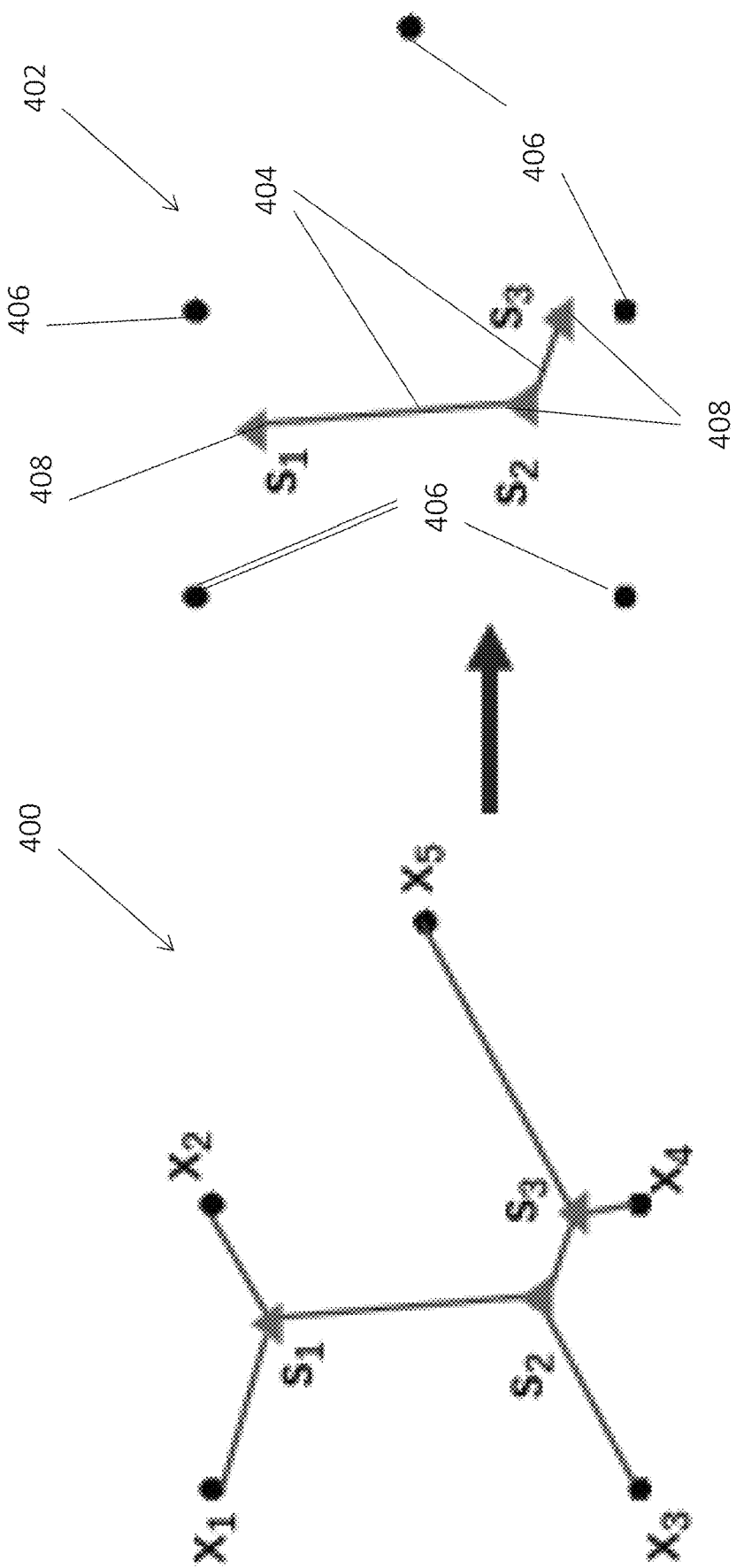
FIG. 4 is an illustration of an example Steiner tree and subtree being composed in accordance with an embodiment of the present invention.

Preferably, referring to FIG. 4, the processing module 202 is arranged to compose a subtree 402 of Steiner nodes 408 connected by connecting edges 404, wherein the subtree 402 is arranged to connect with the plurality of terminal nodes 406 in a skeleton tree 400. In this example embodiment, it is more preferable to determine the positions of the branching nodes and the cable edge connecting the branching nodes, as the cable edge between the branching nodes, i.e. the connecting edges 404, are usually of a higher bandwidth capacity when compared to the cable edges connecting the terminal nodes to the branching units, since the connecting edges 404 in the branching unit usually have to support a higher network traffic.

With reference to FIG. 4, the skeleton tree 400 of the topology $\mathcal{T}$ is the subtree $\mathbb{T} =(S, E_2)$ 402 composed only of Steiner nodes 408 with the connecting edges 404.

Figures 5A, 5B:
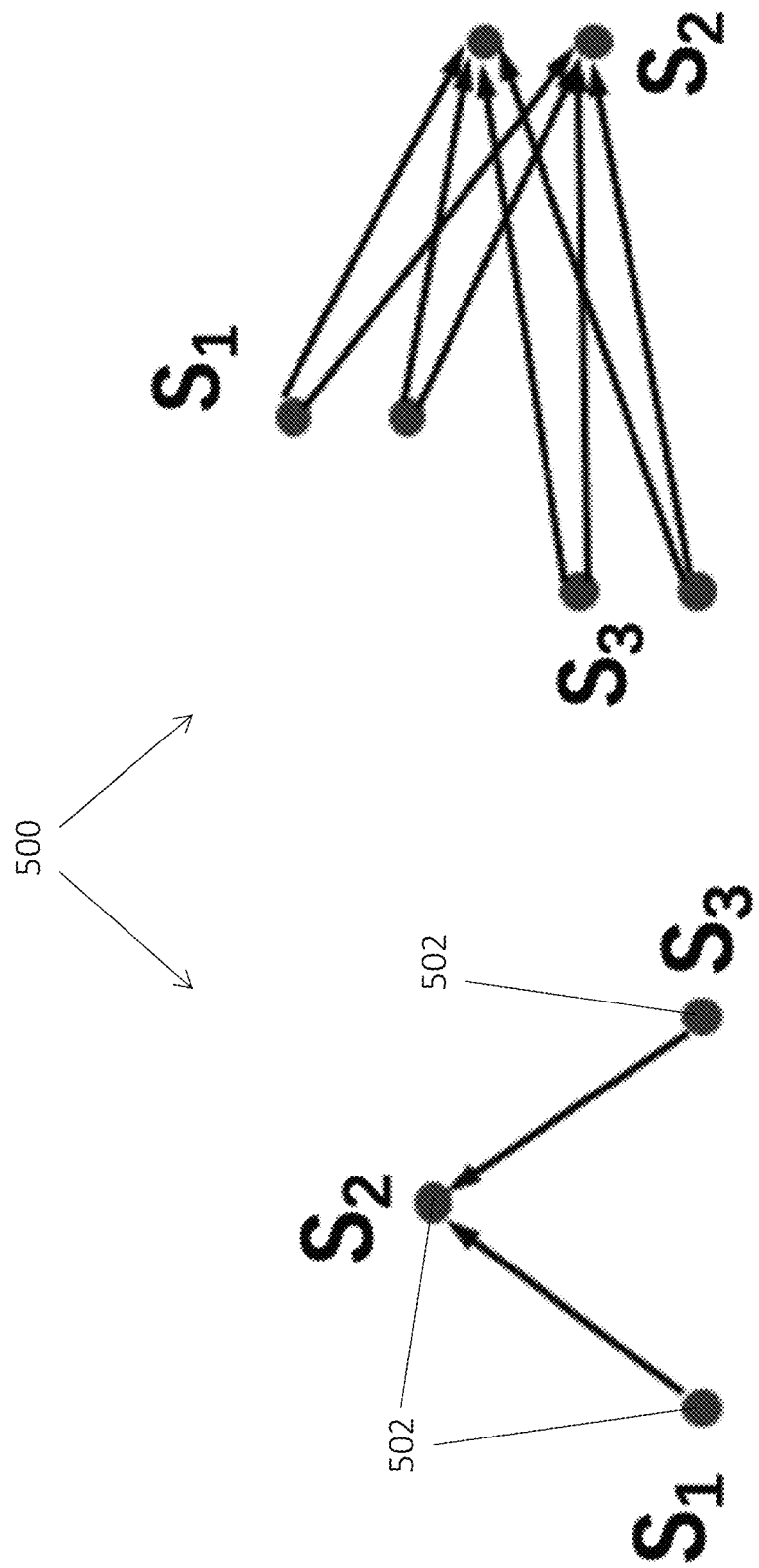
FIG. 5A is an illustration of a skeleton tree with $S_2$ being the root of the Steiner tree of FIG. 4.
FIG. 5B is an illustration of DAG corresponding to the Steiner topology and the Steiner tree of FIG. 4.

Also with reference to FIG. 5A, for a tree 500 with a Steiner topology $\mathcal{T}$, an arbitrary Steiner node $s_r$ may be chosen as the root of the skeleton tree $\mathbb{T}$, $s_r \in \mathbb{T}$, and an orientation towards the root may be assigned to edges of $\mathbb{T}$. Then, $\mathbb{T}$ becomes a directed rooted tree (i.e., anti-arborescence). Nodes 502 of the skeleton tree are ordered so that children of a given node si appear earlier in the list than the parent node (that is, with arrows from them to $s_i$). Such an order is called a topological order. Without loss of generality, the Steiner nodes are relabeled as 1, 2, . . . , M, where M corresponds to the root of $\mathbb{T}$.

Defining $\overline{x}_i=x_{N+i}$, i=1, 2, . . . , M, and altering the order of Steiner nodes $x_{N+i} \in \mathbb{M}$ in Eq. (3) does not change the optimization problem, then:

$$\min_{x, \beta(\cdot), \Gamma} \Psi(x, \beta(X), \Gamma) = \min_{\overline{x}_M, \overline{x}_{M-1}, \ldots, \overline{x}_1} \Phi(\overline{x}_M, \overline{x}_{M-1}, \ldots, \overline{x}_1) \quad (4)$$

Defining $\Phi(\overline{x}_i)=\overline{c}_\beta(\overline{x}_i)$ for any leaf i, then:

$$\Phi^*(\overline{x}_M, \overline{x}_{M-1}, \ldots, \overline{x}_1) = \min_{\overline{x}_M, \overline{x}_{M-1}, \ldots, \overline{x}_1} \Phi(\overline{x}_M, \overline{x}_{M-1}, \ldots, \overline{x}_1). \quad (5)$$

Preferably, the processing module 202 is further arranged to solve a dynamic programming problem associated with an optimization problem for a total cost of the physical cable network formed by the cable edges in the telecommunication network to determine a minimum cumulative cost of the cable edge and the branching nodes, for example, by combining this definition with Eq. (3) and (4), the above problem may be converted to a dynamic programming (DP) problem:

$$\Phi^*(\overline{x}_M, \overline{x}_{M-1}, \ldots, \overline{x}_1) = \min_{\overline{x}_M} \left[ \overline{c}_\beta(\overline{x}_M) + \sum_{\substack{(j,M) \in E_2 \\ j \in C(M)}} \min_{\gamma_{jM}} c_\beta(\overline{x}_j, \overline{x}_M) + \Phi^*(\overline{x}_{M-1}, \ldots, \overline{x}_1) \right] + M \cdot c_{BU} \quad (6)$$

With reference to FIG. 5B, to solve this problem, a new directed acyclic graph (DAG) G=(V', E') based on $\mathbb{T}$ may be constructed. Each Steiner node $i \in \mathbb{T}$ is associated with a subset $A_i$ of V', where $A_i$ are grid nodes of MI and the weight on each node is $\overline{c}_{ui}(x)$. It follows that $V' = \cup_{i \in S} A_i$; that is, V' is composed of m copies of the grid nodes of M. For an arc $e=(i,j) \in E_2$, where $s_j$ is the parent of $s_i$, then a complete connection from $A_i$ to $A_j$ for G may be constructed; that is, an arc $\varepsilon=(p, q)$ from every $x_p \in A_i$ to every $x_q \in A_j$ in G. The cost of the arc $\varepsilon$ is defined as the minimum cost from node $x_p$ to node $x_q$, calculated by FMM, i.e., $w(\varepsilon)=w(p, q)=\min \overline{c}_\beta(x_p, x_q)$. For node $x_p \in A_i$, the minimum cumulative cost (MCC), $\phi^i_p$, is:

$$\phi^i_p = \overline{c}_\beta(x_p) + \sum_{j \in C(i)} \min_{q \in A_j} \left( w(x_q, x_p) + \phi^j_q \right). \quad (7)$$

Referring to the DAG-Least-Cost-Tree algorithm, the minimum cost tree on a DAG may be found and the coordinates of the Steiner nodes may also be obtained. In accordance with a preferred embodiment, a weighted edge SMT Algorithm (WESTM Algorithm) is provided as follows, which considers cable capacity, cable length, and the number of Steiner nodes to find the minimum total cost tree on a DAG and returns the coordinates of the Steiner nodes.

WE-STM Algorithm

Input: The graph G=(V', E'), BU cost ($b_i$) for each BU connecting specified three edges, the cost of each cable edge per kilometer, $\beta(e_1), \ldots, \beta(e_5)$.

Output: Coordinates of Steiner nodes $s_i$, i=1, ..., M, the total cost of the cable network $\psi$(T).

```
1: for i = 1, ..., M do
2:    for each node x_p ∈ A_i do
3:       if i is a leaf in T then
4:          Φ^i_p = c̄_β(x_p) + b_p;
5:          π (x_p) = NIL;
6:       else
7:          for each child s_j of s_i do
8:             π (x_p, j) = NIL;
9:          end for
10:         Φ^i_p = 0;
11:      end if
12:   end for
13: end for
14: for i = 1, ..., M, i is not a leaf do
15:    for each node x_p ∈ A_i do
16:       for each child s_j of s_i do
17:          ψ = ∞;
18:          for each node x_q ∈ A_j do
19:             Ψ' = Φ^j_q + w(x_q, x_p) + b_q;
20:             if ψ > ψ' then
21:                ψ > ψ';
                   π (x_p, j) = q;
22:             end if
23:          end for
24:          Φ^i_p = Φ^i_p + Ψ;
25:       end for
26:       Φ^i_p = Φ^i_p + c̄_β(x_p);
27:    end for
28: end for
29: Let P̂_M = argmin_{X_p} ∈ A_M Φ^M_p
30: Trace back from p̂_M to leaves via π;
31: return x_{p̂1}, ..., x_{p̂M}, ψ(T).
```

In WE-STM Algorithm, Lines 1-13 calculate the cable cost for the path connecting the leaves of the Steiner node tree with corresponding terminals. Implementation of Eq. (6) is in Lines 14-28. If a leaf node in T has the same coordinates as a terminal node, then the BU cost bi at this location is zero. Once the iterations reach the root, in Line 32, grid node P̂ (with MCC $\phi^M_p$) may be chosen in $A_M$. Node P̂ is the physical Steiner node corresponding to the root. To derive the coordinates of the remaining Steiner nodes, tracking back on G starting from P̂. In this way the path γ of the tree with a specific cable bandwidth and total cost, and the total length may be found.

Figure 6B:
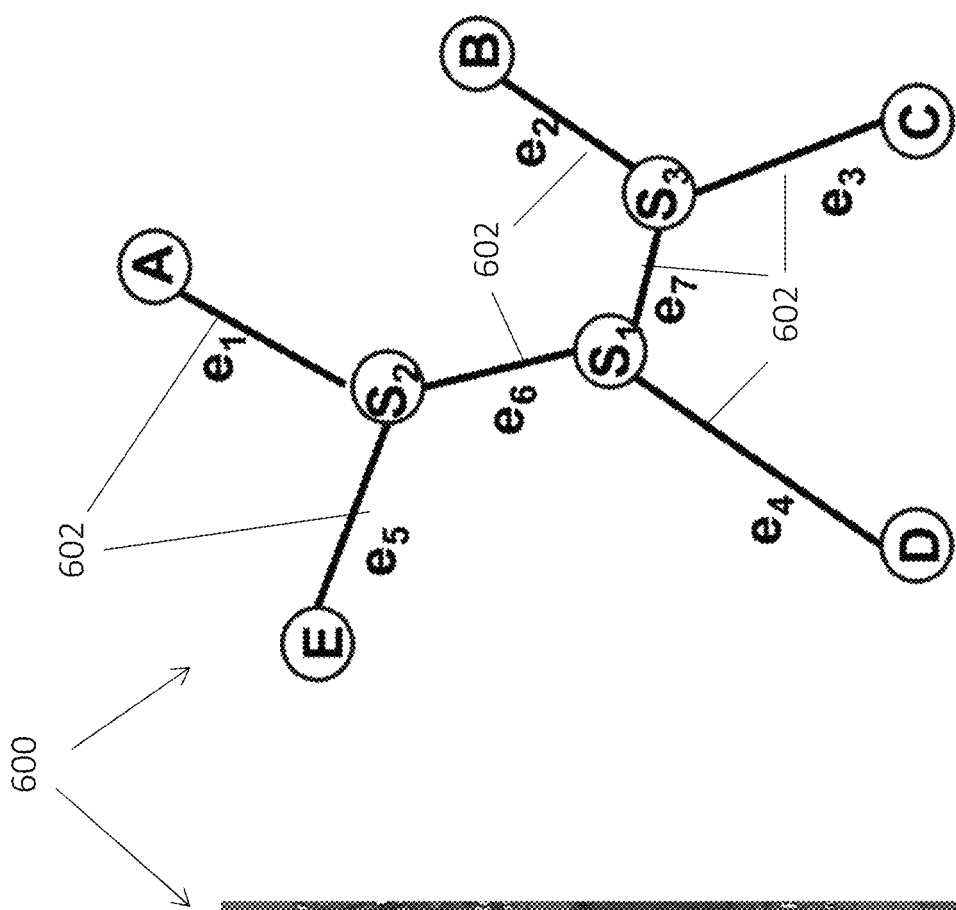
FIG. 6B is a corresponding network topology of the optimized network of FIG. 6A.
Figure 6A:
FIG. 6A is a map showing locations of five terminal nodes of a telecommunication network optimized by a system for optimizing a cable system in a telecommunication network in accordance with an embodiment of the present invention.

With reference to FIG. 6A, there is shown an application of method in accordance with an embodiment of the present method to an example network topology 600 deployed in the region, spanning from the north-west corner (45.000° N, 0.000° E) to the southeast corner (36.000°N, 11.000° E). In this example, a cable system that connects the following six locations in this region: Genoa (44.407°N, 8.963° E), Alghero (40.580° N, 8.324° E), Tunis (37.341°N, 9.078° E), Algiers (36.832°N, 3.052° E), and Barcelona (41.399°N, 2.085° E), denoted by A, B, C, D, E, respectively, may be optimized.

Optionally or additionally, the optimization module 204 is further arranged to determine the optimized geographical locations of the plurality of branching nodes and cable paths based on additional attributes associated with a deployment of the telecommunication network and/or the maintenance of the telecommunication network after deployment. For example, additional attributes such as laying cost of the submarine cables, repair rates of the branching nodes or the submarine cables and cable paths based on geodesics may be considered, and accordingly, whilst it is generally preferable to shorten the submarine cable in used, the submarine cables and/or the branching nodes may be deployed at locations which are not close to geographical locations which are "risky", i.e. with a higher chance that cable may be damaged, which may result in the use of longer cables than deploying the network of cables with the shortest possible paths.

In one example embodiment, bathymetric data from the Global Multi-Resolution Topography synthesis may be used. The cost function takes account of the trade-off between laying cost and the total number of repairs and the appropriate cable protection at each point in the manifold. The total number of repairs (i.e. the repair rates) may be associated with earthquake-related cable damage risk and human activity-related risk, at predetermined geographical locations. On the other hand, the cable laying cost is based on the cable bandwidth level and seabed depth, and the optimization module 204 may shorten the cable edge with highest capacity than other cable edges within the telecommunication network thereby optimizing an efficiency of utilization of cable resources during the deployment of the telecommunication network.

For example, assuming the cost of BUs varies between $1-3 million. In the example embodiment referring to FIGS. 6A and 6B, the bandwidth requirements of each edge 602 and in an example network to be deployed are shown in the following table.

| pairs of nodes | bandwidth |
|---|---|
| (A, B) | 10 Tbps |
| (A, C) | 20 Tbps |
| (A, D) | 10 Tbps |
| (A, E) | 10 Tbps |
| (B, C) | 30 Tbps |
| (B, D) | 20 Tbps |
| (B, E) | 10 Tbps |
| (C, D) | 30 Tbps |
| (C, E) | 20 Tbps |
| (D, E) | 10 Tbps |

Based on these QoS requirements and the network topology 600 as shown in FIG. 6B, the least feasible bandwidth and the cable cost per km for each edge in the tree network may be obtained, as shown in the following table.

| edge | bandwidth requirement | cable cost per kilometer |
|---|---|---|
| e1 | 50 Tbps | $25,000 |
| e2 | 70 Tbps | $28,000 |
| e3 | 100 Tbps | $32,000 |
| e4 | 70 Tbps | $28,000 |
| e5 | 50 Tbps | $25,000 |
| e6 | 80 Tbps | $38,000 |
| e7 | 110 Tbps | $42,000 |

In this example, it is assumed that basic bandwidth and cost of cable construction are 50 Tbps and $25,000 per km, respectively. These figures, while not exact, serve as a reasonable surrogate for the actual cost, including laying costs. As bandwidth increases, the total cost of cable construction increases.

Figure 7B:
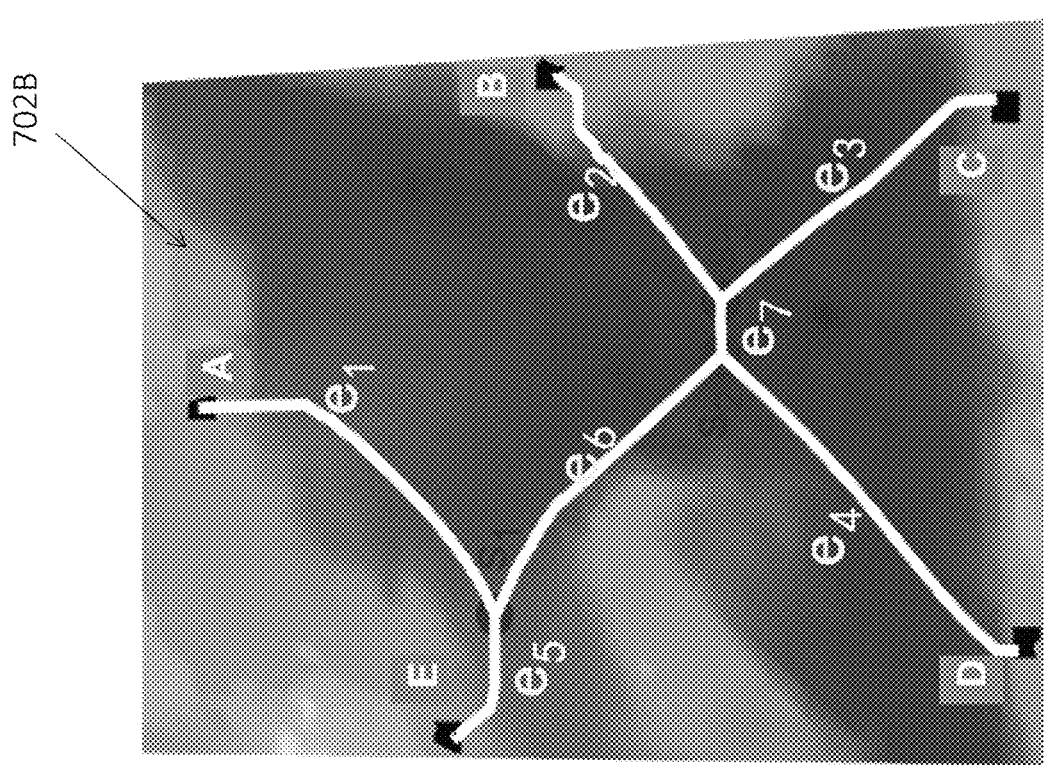
FIG. 7B is an illustration showing paths of cable edges in an optimized network connecting the five terminal nodes of FIG. 6A.
Figure 7A:
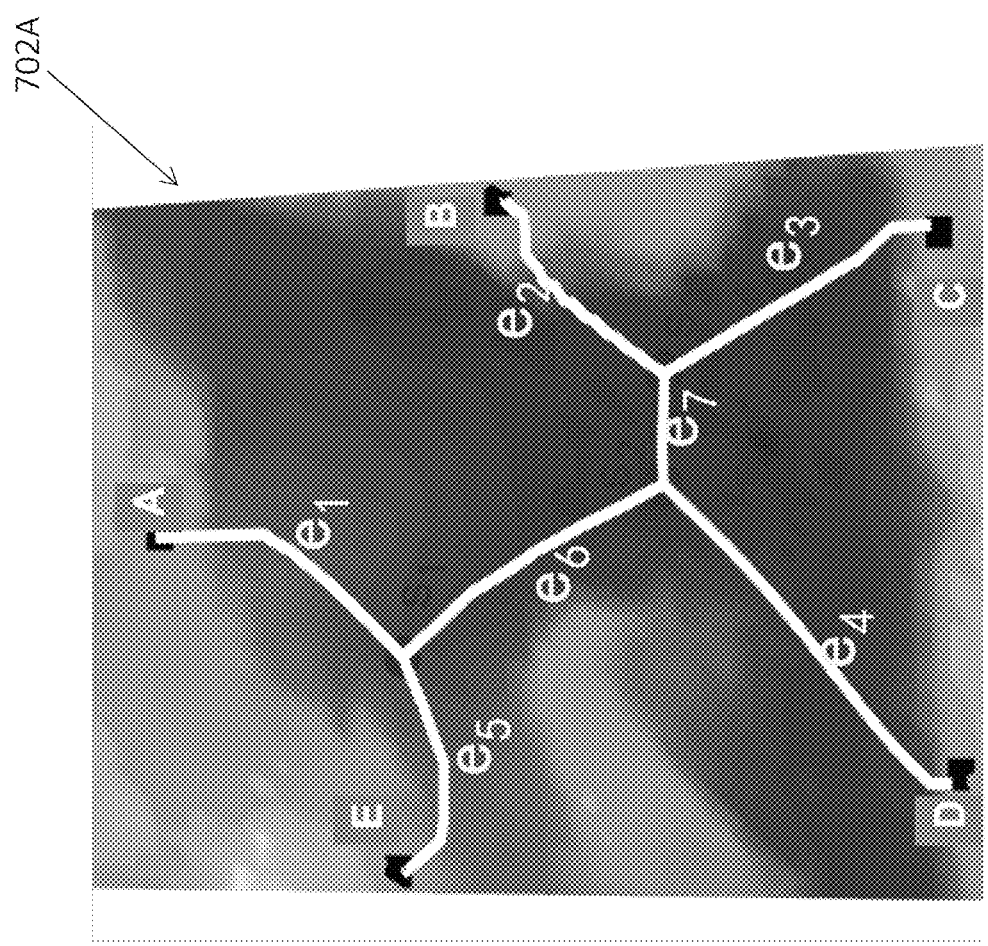
FIG. 7A is an illustration showing paths of cable edges in an unoptimized network connecting the five terminal nodes of FIG. 6A.

Leaving aside cable capacity requirements, and assigning all cables the same bandwidth, an unoptimized network deployment topology 702 as shown in FIG. 7A may be obtained. With this cable configuration, to meet the bandwidth requirements of all paths, capacities of 110 Tbps or more are needed, with costs of $42,000 per kilometer, and a total cost of the cable network of $13.312 million.

Alternatively, when capacity diversity is considered in the optimization, each edge in the tree network only needs to meet its assigned network bandwidth demand. The resulting optimal network topology 704 may be obtained, with reference to FIG. 7B, with a total cost of $9.218 million, representing a 30.75% reduction in cost. In this optimized network 702B, the total length of cable edges $e_6$ and $e_7$ have been shortened by 97.75 km when compared to the unoptimized network 702A. Advantageously, high-capacity cables are shortened to lower the overall cost of the cable network.

It should be appreciated by a skilled person that the method may also used to optimize other types of network, such as power network or wireless communication network, when the QoS requirements and the cost for deploying suitable linkages with different capacities among different base stations or branching stations are different.

These embodiments may be advantageous in that, a method for optimizing deployment of network paths in a telecommunication network is provided, considering also the laying cost and QoS requirements of the cables, and the risks in operating the network in long term. The present invention provides a significant advance in submarine cable system optimization approach that can effectively optimize the positions of Steiner nodes, bandwidth capacity, and cable paths while taking into account the requirements of real-world scenarios.

Submarine fiber optic cables are a critical component of the global telecommunications infrastructure, responsible for transmitting vast amounts of data across oceans, and connecting people and businesses around the world. Higher numbers and quality of optical fibers in a cable lead to higher costs.

Advantageously, by optimizing the network topology in the planning stage, it is possible to minimize costs of the network during the construction of an undersea cable system requires consideration of the appropriate bandwidth capacity to meet network requirements.

The optimization problem is provided as a weighted edges Steiner minimal tree problem, taking into account the bandwidth capacity of each edge. Moreover, a WE-SMT algorithm may be employed to optimize the network by optimizing the locations of Steiner nodes, the bandwidth capacity of each cable edge, and the cable path for given terminal node locations and bandwidth capacity requirements.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include tablet computers, wearable devices, smart phones, Internet of Things (IoT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for optimizing a cable system in a submarine cable network which comprises a plurality of submarine cables with different cable specifications, the system comprising:
a processing module arranged to:
determine a distance based on a position of each of a plurality of terminal nodes;
receive data defining the plurality of submarine cables with different cable specifications, wherein each cable specification includes a specific bandwidth capacity and an associated cost per unit length; and
determine, for each potential cable edge between adjacent pairs of nodes of the plurality of terminal nodes or a plurality of branching nodes provided in the submarine cable network, a set of possible edge weights based on the associated cost per unit length for each of the different cable specifications,
wherein the submarine cable network is arranged to facilitate communication among the plurality of terminal nodes via at least one of the plurality of branching nodes; and an optimization module arranged to, using a weighted edges Steiner minimum tree process that considers the set of possible edge weights:
provide an optimized geographical location of the branching nodes, wherein the optimized geographical locations are positions of Steiner nodes; and
select, for each cable edge in the submarine cable network being deployed, an optimized submarine cable from the plurality of submarine cables with different cable specifications, thereby providing an optimized bandwidth capacity for the cable edge, in which the submarine cable network being deployed with the branching nodes at the positions of Steiner nodes and the selected optimized submarine cables for the cable edges meets a quality of service (QOS) requirement associated with a minimum bandwidth requirement associated with an operation of the submarine cable network.

2. The system in accordance with claim 1, wherein the optimization module is arranged to determine the optimized geographical locations of the plurality of branching nodes and cable paths connecting the branching nodes in a subnetwork connecting the plurality of terminal nodes.

3. The system in accordance with claim 2, wherein the processing module is arranged to compose a subtree of Steiner nodes connected by connecting edges, wherein the subtree is arranged to connect with the plurality of terminal nodes in a skeleton tree.

4. The system in accordance with claim 3, wherein the processing module is further arranged to solve a dynamic programming problem associated with an optimization problem for a total cost of the physical cable network formed by the cable edges in the telecommunication network to determine a minimum cumulative cost of the cable edge and the branching nodes.

5. The system in accordance with claim 2, wherein the optimization module is further arranged to determine the optimized geographical locations of the plurality of branching nodes and cable paths based on additional attributes associated with a deployment of the telecommunication network and/or the maintenance of the telecommunication network after deployment.

6. The system in accordance with claim 5, wherein the additional attributes includes at least one of laying cost of the submarine cables, repair rates of the branching nodes or the submarine cables and cable paths based on geodesics.

7. The system in accordance with claim 6, wherein the optimization module is further arranged to shorten the cable edge with highest capacity than other cable edges within the telecommunication network thereby optimizing an efficiency of utilization of cable resources during the deployment of the telecommunication network.

8. The method in accordance with claim 6, wherein the repair rates of the branching nodes or the submarine cables are associated with earthquake-related cable damage risk and human activity-related risk at a predetermined geographical location.

9. A method for optimizing a cable system in a submarine cable network comprising a plurality of submarine cables with different cable specifications, the method comprising the steps of:
receiving position data for each of a plurality of terminal nodes;
receiving data defining the plurality of submarine cables with different cable specifications, wherein each cable specification includes a specific bandwidth capacity and an associated cost per unit length;
receiving a minimum bandwidth requirement associated with an operation of the submarine cable network;
determining, by a processing module, for each potential cable edge between adjacent pairs of nodes of the plurality of terminal nodes or a plurality of branching nodes provided in the submarine cable network, a set of possible edge weights based on the associated cost per unit length for each of the different cable specifications, and determining a distance for the potential cable edges, wherein the submarine cable network is arranged to facilitate communication among the plurality of terminal nodes via at least one of the plurality of branching nodes; and
by using a weighted edges Steiner minimum tree process that considers the set of possible edge weights, providing an optimized geographical location of the branching nodes, wherein the optimized geographical locations are positions of Steiner nodes; and
selecting, for each cable edge in the submarine cable network being deployed, an optimized submarine cable from the plurality of submarine cables with different cable specifications, thereby providing an optimized bandwidth capacity for the cable edge, in which the submarine cable network being deployed with the branching nodes at the positions of Steiner nodes and the selected optimized submarine cables for the cable edges meets a quality of service (QOS) requirement associated with the minimum bandwidth requirement.

10. The method in accordance with claim 9, wherein the weighted edges Steiner minimum tree process comprises the step of the determining the optimized geographical locations of the plurality of branching nodes and cable paths connecting the branching nodes in a subnetwork connecting the plurality of terminal nodes.

11. The method in accordance with claim 10, wherein the step of determining the optimized geographical locations of the plurality of branching nodes comprising the step of composing a subtree of Steiner nodes connected by connecting edges, wherein the subtree is arranged to connect with the plurality of terminal nodes in a skeleton tree.

12. The method in accordance with claim 11, further comprising the step of solving a dynamic programming problem associated with an optimization problem for a total cost of the physical cable network formed by the cable edges in the telecommunication network to determine a minimum cumulative cost of the cable edge and the branching nodes.

13. The method in accordance with claim 10, further comprising the step of determining the optimized geographical locations of the plurality of branching nodes and cable paths based on additional attributes associated with a deployment of the telecommunication network and/or the maintenance of the telecommunication network after deployment.

14. The method in accordance with claim 13, wherein the additional attributes include at least one of laying cost of the submarine cables, repair rates of the branching nodes or the submarine cables and cable paths based on geodesics.

15. The method in accordance with claim 14, further comprising the step of shortening the cable edge with highest capacity than other cable edges within the telecommunication network thereby optimizing an efficiency of utilization of cable resources during the deployment of the telecommunication network.

16. The method in accordance with claim 14, wherein the repair rates of the branching nodes or the submarine cables are associated with earthquake-related cable damage risk and human activity-related risk at a predetermined geographical location.

* * * * *